Figure 4:
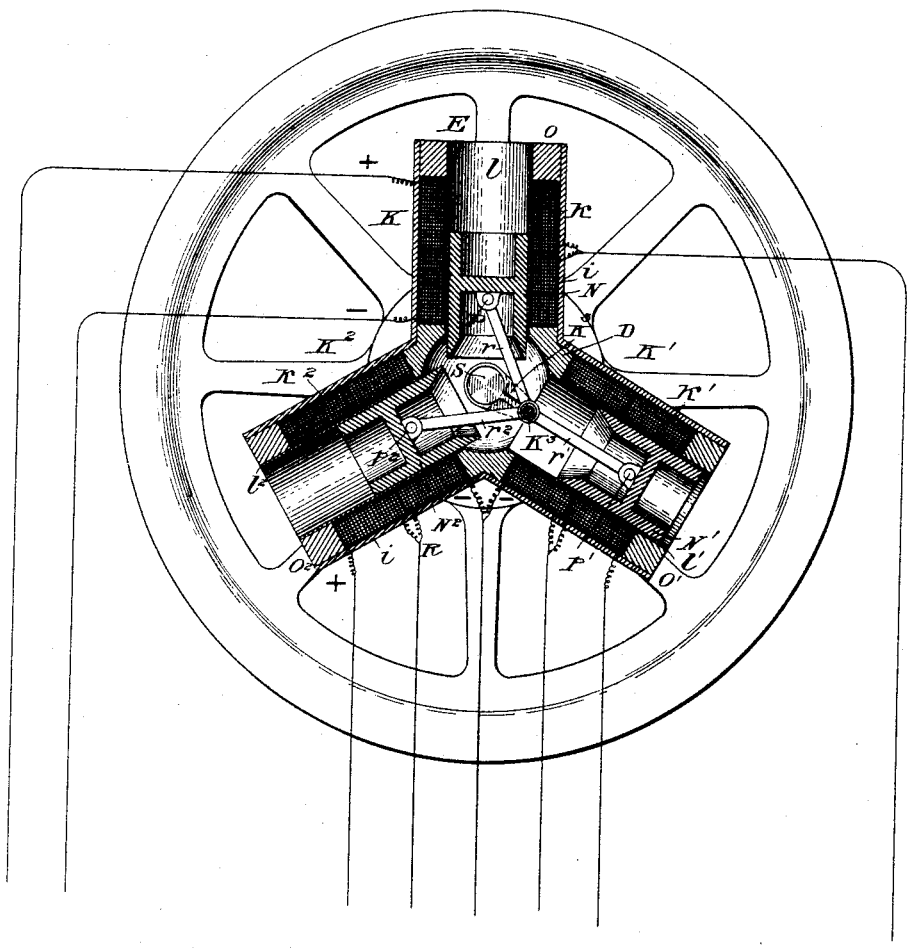

(No Model.) 3 Sheets—Sheet 1.
C. J. VAN DEPOELE.
RECIPROCATING ELECTRIC RAILWAY MOTOR SYSTEM.
No. 450,542. Patented Apr. 14, 1891.
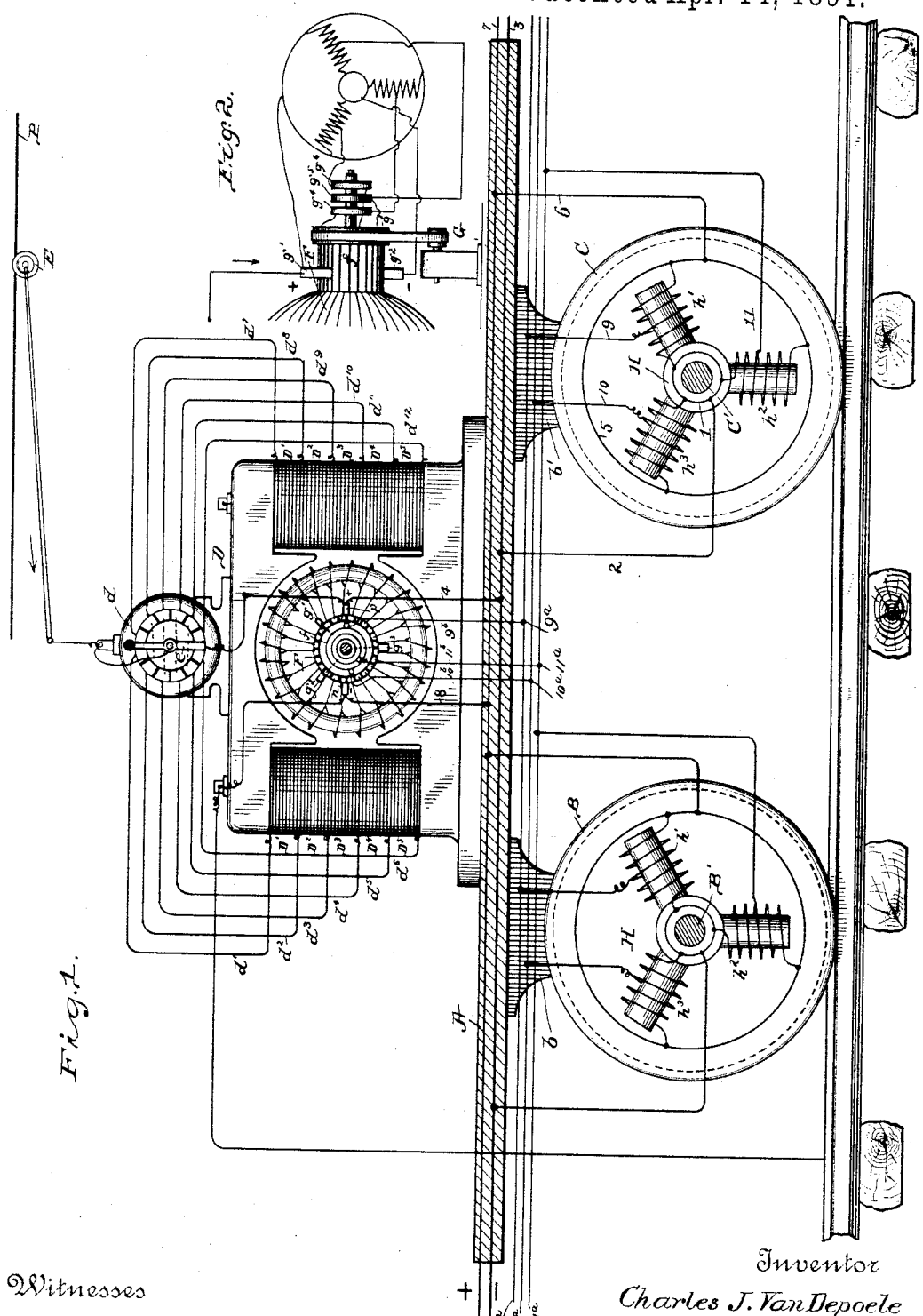
Witnesses
H. A. Lamb
Stephen Jammus
Inventor
Charles J. Van Depoele
By Frankland Jammus
Attorney

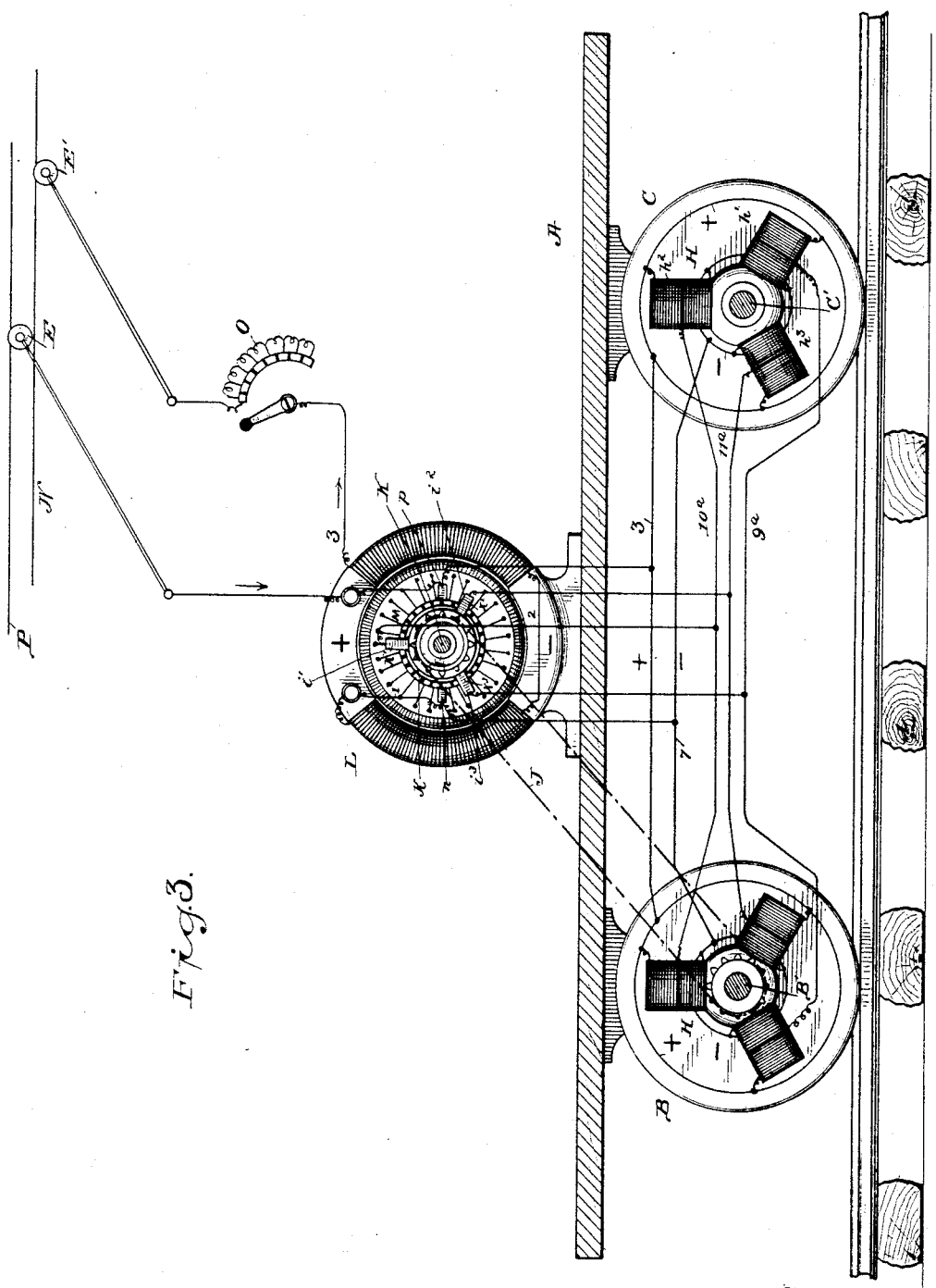

(No Model.)

C. J. VAN DEPOELE.
RECIPROCATING ELECTRIC RAILWAY MOTOR SYSTEM.

No. 450,542. Patented Apr. 14, 1891.

3 Sheets—Sheet 3.

WITNESSES

INVENTOR
Charles J. Van Depoele
by Frankland Jannus
atty.

UNITED STATES PATENT OFFICE.

CHARLES J. VAN DEPOELE, OF LYNN, MASSACHUSETTS.

RECIPROCATING ELECTRIC-RAILWAY MOTOR SYSTEM.

SPECIFICATION forming part of Letters Patent No. 450,542, dated April 14, 1891.

Application filed September 19, 1890. Serial No. 365,543. (No model.)

*To all whom it may concern:*

Be it known that I, CHARLES J. VAN DE-POELE, a citizen of the United States, residing at Lynn, in the county of Essex and State of Massachusetts, have invented certain new and useful Improvements in Reciprocating Electric-Railway Motor Systems, of which the following is a description, reference being had to the accompanying drawings, and to the letters and figures of reference marked thereon.

My invention relates to improvements in electric motors, and more especially in electric motors of the reciprocating type which are applied to develop rotation of the axles of vehicles to be driven.

According to my present invention reciprocating motors, desirably of the three-cylinder type, are connected directly with a crank upon the axle to be driven, and, being supported concentric therewith, no intermediate or intervening connections are required, since the pistons of my reciprocating engines, from which the power is communicated directly to the work, are capable of being moved at any desired speed, whether fast or slow.

The method upon which my improved reciprocating electric engine operates is shown, described, and claimed in Letters Patent No. 431,494, granted to me July 1, 1890, in the present instance the same being applied to the production of rotary motion instead of to the operation of a reciprocating tool. The rotary motion is controlled, according to the present invention, by means of a motor device employed to produce the current-pulsations, and in operation the system comprises a source of continuous currents extending along the line of way, traveling vehicles, electric motors for propelling the same, said motors being of the reciprocating type, and, according to the present invention, traveling current-collecting devices and means located between the traveling contacts and the motors for imparting to the current a constant rising and falling quality and directing the pulsations of current in the proper motor-coils in succession.

In the accompanying drawings, Figure 1 is a view in elevation, partly in diagram, showing part of a railway-car truck equipped with propelling-motors according to the present invention, and also provided with means for supplying the desired currents to the motors and for regulating and controlling the same. Fig. 2 is a detail view of part of the current-distributing mechanism seen in Fig. 1. Fig. 3 is a diagrammatic elevation differing from Fig. 1 in the details of the current-distributing apparatus. Fig. 4 is a transverse elevation partly in section, showing the connections between the moving parts of a three-cylinder reciprocating engine and the axle to be driven.

In said Fig. 1, A is the bed or platform of a car-body. B and C are the carrying-wheels on the far side thereof, the two front wheels being removed for convenience of illustration. B' C' are the axles, which are suitably supported in any desirable form of bearings carried by pedestals $b$ $b'$. Upon the bed A or other convenient support is placed an electro-dynamic machine D.

The machine D is provided with sectional field-magnet coils D' $D^2$ $D^3$ $D^4$ $D^5$, which are connected by conductors $d'$ $d^2$ $d^3$ $d^4$ $d^5$ $d^6$ $d^7$ $d^8$ $d^9$ $d^{10}$ $d^{11}$ $d^{12}$ with separate insulated sections upon a commutator-switch $d$. The switch $d$ is provided with a movable contact $e$, which is electrically connected through a traveling contact E or otherwise with a conductor P, extending from the source of current. By means of this switch $d$ the supply-current is admitted to a greater or less number of the field-magnet coils for varying the power thereof. The armature F may be of the Gramme or other continuous-current type and is provided with a sectional commutator $f$. Main stationary, positive, and negative commutator-brushes $p$ $n$ are adjustably sustained in operative relation to the commutator, in addition to which three equidistant brushes $g'$ $g^2$ $g^3$ are arranged to be rotated about the periphery thereof—as, for example, by a small motor G, which may be mechanically connected to the said brushes in any convenient manner—for instance, as seen in Fig. 2. The speed of the motor G is separately controllable, so that the rate of rotation of the brushes $g'$ $g^2$ $g^3$ about the commutator $f$ may be regulated as desired. In order to collect current from the moving brushes, I provide three insulated contact-surfaces $g^4 g^5 g^6$, carried upon a suitable sleeve upon the armature-shaft and connected to and traveling with the moving brushes and actuated by the motor G.

Upon one or both of the axles B' C' is mounted a triple reciprocating electric engine H. These engines are constructed substantially as set forth in my prior application, Serial No. 353,247, filed May 26, 1890—that is to say, the magnetic pistons moving within the actuating-coils $h'\ h^2\ h^3$ are all three connected to a crank upon the axle by which the engines are carried, the said engines being sleeved upon and concentric with said axles and prevented from bodily rotation by suitable mechanical connections to the truck of the car or otherwise.

Each one of the coils of which the triple engines are composed is in the form of a double solenoid, all the inner terminals of which are connected to a supply-conductor 1, which is connected to the positive brush of the machine D by conductors 2 3 4, all the outer terminals of the said coils being connected to a common return-conductor 5, which is connected to the negative brush of the machine D, and thence to the return-conductor through conductors 6 7 8. The said solenoids are therefore in multiple arc between the main brushes of the machine D. Current is caused to rise and fall alternately in the said engine-coils by means of the triple moving brushes, one of which is electrically connected midway of each of the solenoids $h'\ h^2\ h^3$ through conductors 9 10 11, which are connected by conductors $9^a\ 10^a\ 11^a$ and connections $9^b\ 10^b\ 11^b$ with suitable contacts engaging the surfaces $g^4\ g^5\ g^6$, representing the said moving commutator-brushes. It follows, therefore, that as the three brushes $g'\ g^2\ g^3$ and their contacts are moved about the commutator $f$ they will successively approach and recede from the points of maximum and zero electro-motive force, thereby causing a corresponding rise and fall of current in the motor-coils of the triple engines in exact accordance with the movements of the said brushes.

The conductors 3 7 $9^a\ 10^a\ 11^a$ are extended so as to supply both of the triple engines shown, and it will be obvious that the said conductors may only extend between the motors, or they may be connected from car to car and extend to any desired length—as, for instance, throughout a train of cars—in order to supply motors located upon every axle of every car, if so desired, substantially as set forth and claimed in Patents Nos. 434,685 and 434,686, granted to me August 19, 1890.

In Fig. 3 I have shown means for varying the distribution of current to the motor-coils, which, instead of being separately controlled, as in Figs. 1 and 2, is actuated by an axle driven by one of the triple engines, and is always in exact accordance with the speed at which the vehicle is moving. This is accomplished by providing the axle B', for instance, with a sprocket-wheel, and by similarly providing a sleeve I, by which the moving brushes $i'\ i^2\ i^3$ are carried, and mechanically connecting the sprocket-wheels by a suitable chain J. The sleeve I is rotatably mounted upon the armature-shaft K of the electro-dynamic machine L, and is provided with an annular frame $k$, to which brush-holders $k'\ k^2\ k^3$ are secured at equidistant points, suitable brushes—as, for example, blocks of carbon—being inserted in the said brush-holders and held against the face of the commutator by suitable tension-springs.

The electro-dynamic machine L (seen in Fig. 3) is a series motor and may be of any convenient or desired type. As shown, the current collected by the traveling contact E enters the armature M of the machine L by its positive commutator-brush $p$, passing thence through the armature, issuing by the negative commutator-brush $n$, thence by conductor 1 to one side of the field-magnet, and from there by conductor 2 to the other side of the field-magnet, issuing from the coils thereof, and passing by conductor 3 to an adjustable resistance O, and thence by the second traveling contact E' to the negative side of the supply-circuit. The traveling contact E' may of course be supplanted by a rail-connection through the wheels of the car, if desired.

As in the case of Fig. 1, the current supplied to the main terminals of the motor-solenoids is derived from the main commutator-brushes $p\ n$ of the machine L, while the said current is caused to rise and fall alternately in the triple solenoids composing each engine by the rotation of the movable brushes upon the commutator of the said machine L. It will furthermore be apparent that the speed of the armature M of the machine L may be regulated by the use of the adjustable resistance O.

In Fig. 4 I have shown a three-cylinder engine E, adapted to produce rotary motion. The coils $k\ k'\ k^2$ of the solenoids K K' K² are inclosed in a continuous iron envelope $i$, which forms the outside casing and frame of the engine. Inside the coils $k\ k'\ k^2$ are placed diamagnetic tubes $l\ l'\ l^2$, which are securely fastened to the heavy rings O O' O² upon the outer ends of the cylinders and to the casting D, which forms the central crank-chamber M, into which the plungers N N' N² are projected at the inner limit of their stroke. Upon the shaft S, which forms the axis of the engine E, is secured the crank K³, upon the crank-pin $k^3$ of which are journaled the connecting-rods $r\ r'\ r^2$, which are severally pivoted to the plungers N N' N² at $p\ p'\ p^2$.

While I have in this application described a particular form of current-distributer—viz., an electro-dynamic machine operating as a current-distributer, substantially as set forth in my patent, No. 422,858, granted March 4, 1890—it must be understood that the invention is not limited to that particular means of supplying pulsating currents to electric motors connected with the axles to be driven, and while I have described the motors as "triple reciprocating engines" it will also be understood that a greater or less number of motor-coils may be assembled to constitute a motor or engine without departing from the invention.

Various minor modifications and changes may be made in accordance with the principles laid down in the foregoing without departing from the spirit or scope of the invention.

Having described my invention, what I claim, and desire to secure by Letters Patent, is—

1. In a reciprocating electric-railway motor system, the combination, with the vehicle to be driven, of a source of defined rising and falling current moving therewith, a reciprocating motor concentric with the axle thereof and having a plurality of motor-coils, each provided with a movable magnetic piston directly connected thereto, and means for supplying the defined currents to the motor-coils in succession.

2. In a reciprocating electric-railway motor system, a motor-car and a source of rising and falling currents carried thereby an engine concentric with the axle thereof, and comprising a plurality of motor-coils, each provided with a movable piston directly connected to the axle to be driven, and means for shifting the rising and falling supply-current from one set of motor-coils to the other successively.

3. In a reciprocating electric railway-motor system, the combination, with an axle or axles of a vehicle, of multiple reciprocating engines concentric therewith, the moving parts of said engines being directly connected with said axles, a source of current and connections between said source and the main terminals of the motor-coils of the engine or engines, intermediate terminals connected midway of the motor-coils and each to a separate source of rising and falling current, and means for causing the currents to rise and fall in the motor-coils in succession and for regulating and controlling their rate.

4. In a reciprocating electric railway-motor system, the combination, with the axle of a vehicle to be driven, of a triple reciprocating engine, the moving parts of which are mechanically connected thereto, a source of continuous current connected to the outer terminals of the motor-coils of the engine, intermediate conductors connected midway of each of the motor-coils and each to a source of rising and falling current, and means for causing the current to rise and fall alternately in the motor-coils of the engine in succession.

5. In a reciprocating electric-railway motor system, the combination, with a source of continuous current, of a car, reciprocating motors concentric with the axle or axles thereof and each having a plurality of motor-coils provided with movable magnetic pistons directly connected to the axle or axles to be driven, a current-distributer moving with the car and making a traveling contact with the supply-circuit, and electrical connections between the current-distributer and the reciprocating motors upon the axles.

6. In a reciprocating electric-railway motor system, the combination, with a source of continuous current, of a current-distributer comprising an electro-dynamic machine having stationary and movable commutator-brushes upon its commutator, means for actuating the moving brushes, and means also for modifying the electro-motive force of the machine to regulate the current distributed thereby, a reciprocating motor or motors upon the axle or axles to be driven, and connections between the stationary commutator-brushes and the outer and inner terminals of the motor-coils and between the centers of the motor-coils and the moving brushes, whereby current is caused to rise and fall in the motor-coils successively.

7. A reciprocating electric-motor system comprising multiple reciprocating electric engines, direct connections between the moving parts of said engines and a common crank to be driven, a distributer or current-generator giving successive currents of defined rising and falling quality, separate circuits between the distributer and the engines, and means for directing the currents from the distributer to the separate engine-circuits in succession.

In testimony whereof I affix my signature in presence of two witnesses.

CHARLES J. VAN DEPOELE.

Witnesses:
 FRANKLAND JANNUS,
 K. MCKEE.